US009151483B2

(12) United States Patent
Karam

(10) Patent No.: US 9,151,483 B2
(45) Date of Patent: Oct. 6, 2015

(54) HEAT PIPE FOR COOLING OPTICAL SOURCES

(71) Applicant: Raymond Miller Karam, Santa Barbara, CA (US)

(72) Inventor: Raymond Miller Karam, Santa Barbara, CA (US)

( * ) Notice: Subject to any disclaimer, the term of this patent is extended or adjusted under 35 U.S.C. 154(b) by 138 days.

(21) Appl. No.: 14/181,654

(22) Filed: Feb. 15, 2014

(65) Prior Publication Data
US 2015/0233567 A1 Aug. 20, 2015

(51) Int. Cl.
*F21V 29/71* (2015.01)
*F21V 29/51* (2015.01)
*B32B 37/00* (2006.01)
*B32B 37/06* (2006.01)
*B32B 38/00* (2006.01)
*B32B 3/26* (2006.01)
*F21Y 101/02* (2006.01)

(52) U.S. Cl.
CPC ............... *F21V 29/713* (2013.01); *B32B 3/263* (2013.01); *B32B 37/0038* (2013.01); *B32B 37/06* (2013.01); *B32B 38/0012* (2013.01); *F21V 29/51* (2013.01); *B32B 2307/412* (2013.01); *B32B 2310/0843* (2013.01); *B32B 2597/00* (2013.01); *F21Y 2101/02* (2013.01)

(58) Field of Classification Search
CPC ... F21V 29/713; F21V 29/51; F21Y 2101/02; B32B 37/0038; B32B 37/06; B32B 38/0012; B32B 3/263; B32B 2307/412; B32B 2310/0843; B32B 2597/00
See application file for complete search history.

(56) References Cited

U.S. PATENT DOCUMENTS

2008/0170392 A1* 7/2008 Speier et al. .................. 362/227
2010/0067224 A1* 3/2010 Wu ............................... 362/235
2011/0309734 A1* 12/2011 Lin et al. ........................ 313/46

* cited by examiner

*Primary Examiner* — Mary Ellen Bowman
(74) *Attorney, Agent, or Firm* — Shalini Venkatesh

(57) ABSTRACT

Embodiments generally relate to heat pipes and methods for fabricating the same. In one embodiment, the heat pipe comprises a first section bonded to a second section such that a first channel is enclosed therebetween; and a liquid partly filling the first channel. The bonded first and second sections comprise a first area configured to be bonded to a heat-generating device and a second area configured to be bonded to a heat sink. The first channel is characterized by a first portion within the first area and a second portion within the second area. The liquid and at least one of the first section and the second section are transparent at a wavelength emitted by the heat-generating device.

20 Claims, 8 Drawing Sheets

HEAT PIPE FOR COOLING OPTICAL SOURCES

RELATED APPLICATIONS

This application is related to U.S. application Ser. No. 13/291,956, filed Nov. 8, 2011, published as U.S. Patent Publication No. 2013/0112650, which is incorporated herein in its entirety by reference.

BACKGROUND

High intensity light-emitting-diodes (LEDs) are becoming ubiquitous for home, commercial and industrial lighting. However, LEDs generate heat as well as light, and the color of the emitted light changes according to the temperature of the LED. Heat sinks are typically used to try to reduce the temperature fluctuations of the LED, and thus control the color. One current approach is to use fans to cool the LEDs' heat sinks. This method has several disadvantages, including the consumption of power to drive the fans, and the generation of noise by the fans. Other drawbacks include the space taken up by the fans, and the constraints of positioning the fans and heat sinks out of the optical paths. Some of the same issues arise for the cooling of other electronic devices and systems.

It is therefore desirable to provide an improved, small-footprint, passive cooling device that can be reliably attached to the system to be cooled. Optical transparency of any protruding elements, of such a device would be particularly advantageous in optical source cooling applications, in particular for cooling LEDs or other small light sources such as semiconductor lasers.

SUMMARY

The present invention includes a heat pipe comprising a first section bonded to a second section such that a first channel is enclosed therebetween, and a transparent liquid partly filling the first channel. At least one of the first and second sections is transparent. The bonded first and second sections comprise a first area configured to be bonded to a heat-generating device and a second area positioned to have no direct contact with the heat-generating device. The first channel is characterized by a first portion within the first area and a second portion within the second area.

In one aspect, at least one of the first and second sections is configured in the second area to be attached to a heat sink. In another aspect, each of the first and second sections is characterized by a non-planar curvature. In yet another aspect, the first area is characterized by a first substantially flat plane and the second area is characterized by at least one substantially flat second plane that is not co-planar with the first plane.

DETAILED DESCRIPTION

The manner in which the present invention provides its advantages can be more easily understood with reference to FIGS. 1 through 8.

Figure 1:
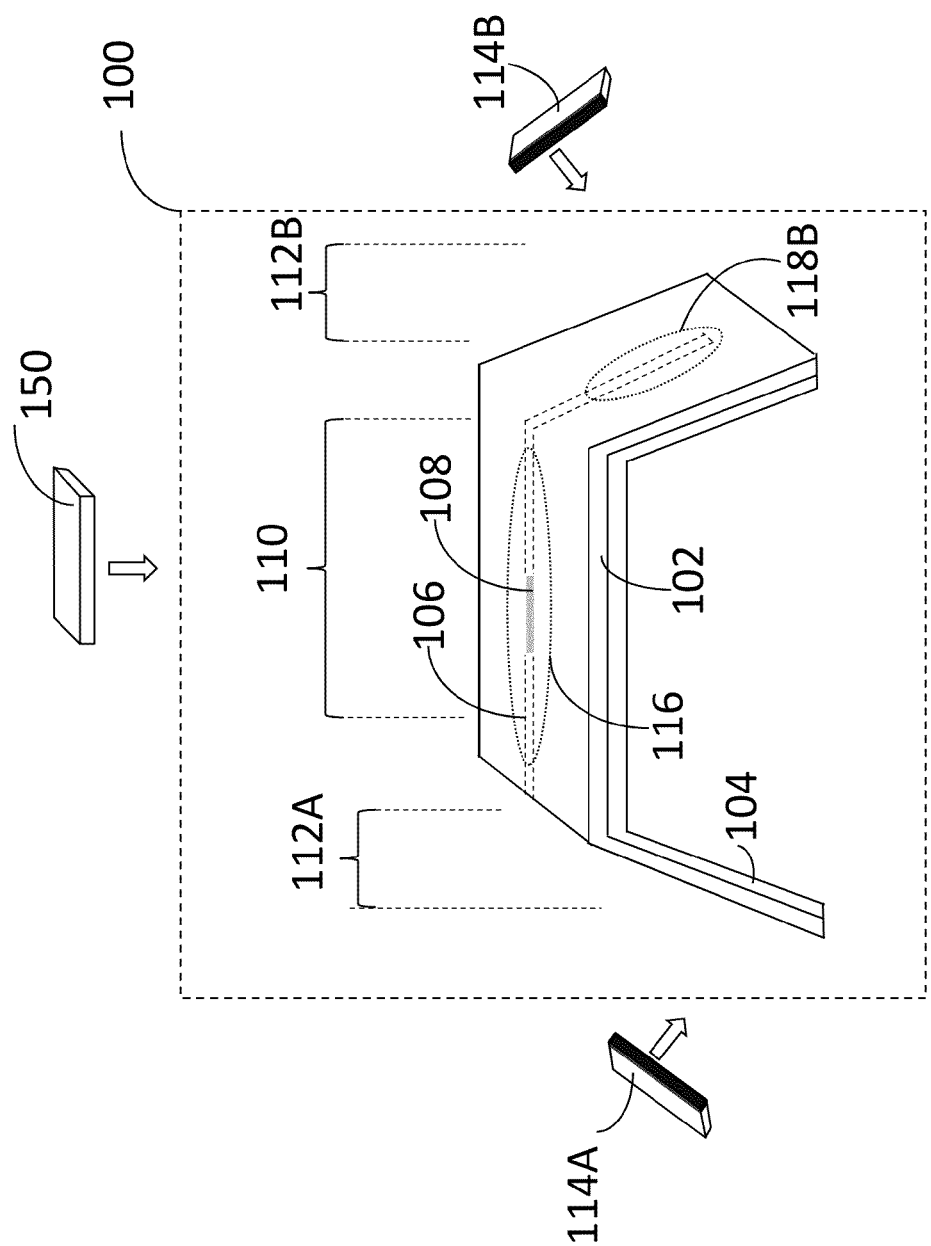
FIG. 1 is a schematic diagram of a heat pipe according to one embodiment.

FIG. 1 is a schematic drawing showing a heat pipe 100 according to one embodiment of the invention, prior to being bonded to a heat-generating device 150 that emits light at at least one wavelength in the UV, visible or infra-red regions of the spectrum. Heat pipe 100 comprises a first section 102 that has been bonded to a second section 104. In this embodiment, a single channel 106 is shown (by dashed lines) as enclosed between first and second sections. The channel may be straight as shown, or curved, for example, to follow a serpentine path. A liquid 108, transparent at the wavelength emitted by 150, partly fills the first channel. At least one of sections 102 and 104 is also transparent at the wavelength emitted by 150.

The bonded first and second sections comprise a first area 110 configured to be bonded to heat-generating device 150 and second and third areas 112A and 112B configured to be bonded to heat sinks 114A and 114B, areas 112A and 112B having no surfaces in direct contact with heat-generating device 150. Channel 106 is characterized by a first portion 116 within the first area 110 and second and third portions 118A (not shown) and 118B within the second and third areas 112A and 112B. In some embodiments, either the second area 112A and second portion 118A, or the third area 112B and third portion 118B may not exist. In some embodiments, either or both of the second and third areas may point upwards, rather than downwards as shown in FIG. 1 and in FIGS. 2 and 3 to be discussed below. In such upward-pointing arrangements, gravity may facilitate the flow of condensed vapor back to the first area during operation of the heat pipe, as will be discussed below. Also, the first area 110 configured to be bonded to heat-generating device 150 may lie on a bottom surface of section 104 rather than a top surface of section 102 as shown in FIG. 1. In other words, embodiments of the invention are not restricted to the particular up-down orientation of the elements shown in FIG. 1, or indeed in FIGS. 2 through 4B.

Embodiments of the current invention may be particularly advantageously used in conjunction with passive heat sinks. However, in some cases, such as those where a large thermal load has to be handled, active heat sinks, involving thermoelectric cooling, for example, or forced convention using fans or pumped water, may be used.

Figure 2:
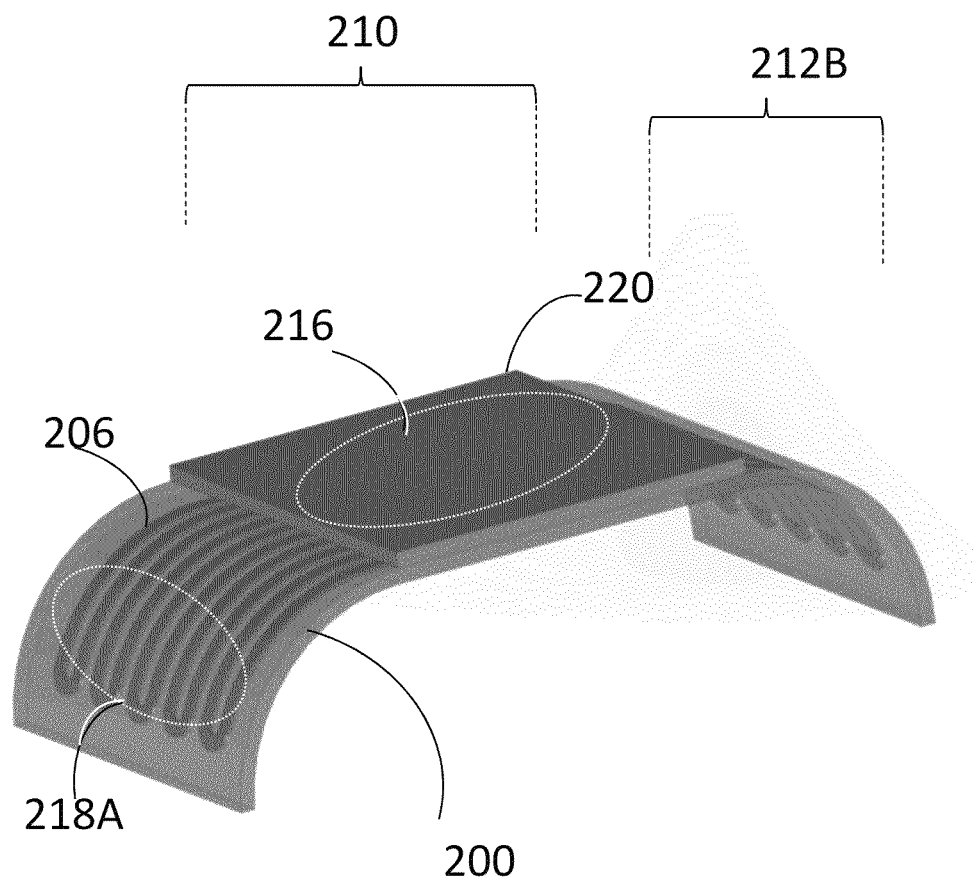
FIG. 2 illustrates a heat pipe configured to be attached to a heat-generating device according to one embodiment.

The embodiment of FIG. 2 shows heat pipe 200 bonded to a plate 220 of a high thermal conductivity material such as Aluminum, to which a heat-generating device (not shown) may be attached. A plurality of channels 206 is shown, enclosed between first and second sections (distinction between sections omitted for visual clarity). Each of the channels 206 is partly filled with a transparent liquid (distinction between channels and enclosed liquid omitted for visual clarity). Similarly to the case of FIG. 1, each of the channels 206 is characterized by a first portion 216 within the first area 210 and second and third portions within the second and third area. Only second portion 218A and third area 212B are explicitly indicated in the figure, for clarity.

In the embodiments shown in FIGS. 1 and 2, the heat pipe is configured such that an outer surface in the first area may be attached to a heat-generating device. In the embodiment shown in an exploded view in FIG. 3, the heat-generating device 350 is enclosed between the first and second sections, 302 and 304, of the heat pipe, so that when the sections are bonded together, surfaces of device 350 are in direct contact with the fluid in channels 306. Electrical leads connecting device 350 to a power source (not shown) may be shaped to conform to the shape of the interface between sections 302 and 304 as shown, to eventually exit via the bond interface having been integrated into the bonding of sections 302 and 304, or, in other embodiments (not shown), be shaped differently to exit through the thickness of one or other of the sections. One or both of the first and second sections may incorporate one or more "cut-out" features, such as 324, that allow convenient access to corresponding leads. In some embodiments, not shown, the two leads may be shaped and positioned to emerge from the same bonded interface (for example the one on the left side shown in FIG. 3) rather than two oppositely positioned interfaces (on the left and right sides as shown in FIG. 3).

Figure 3:
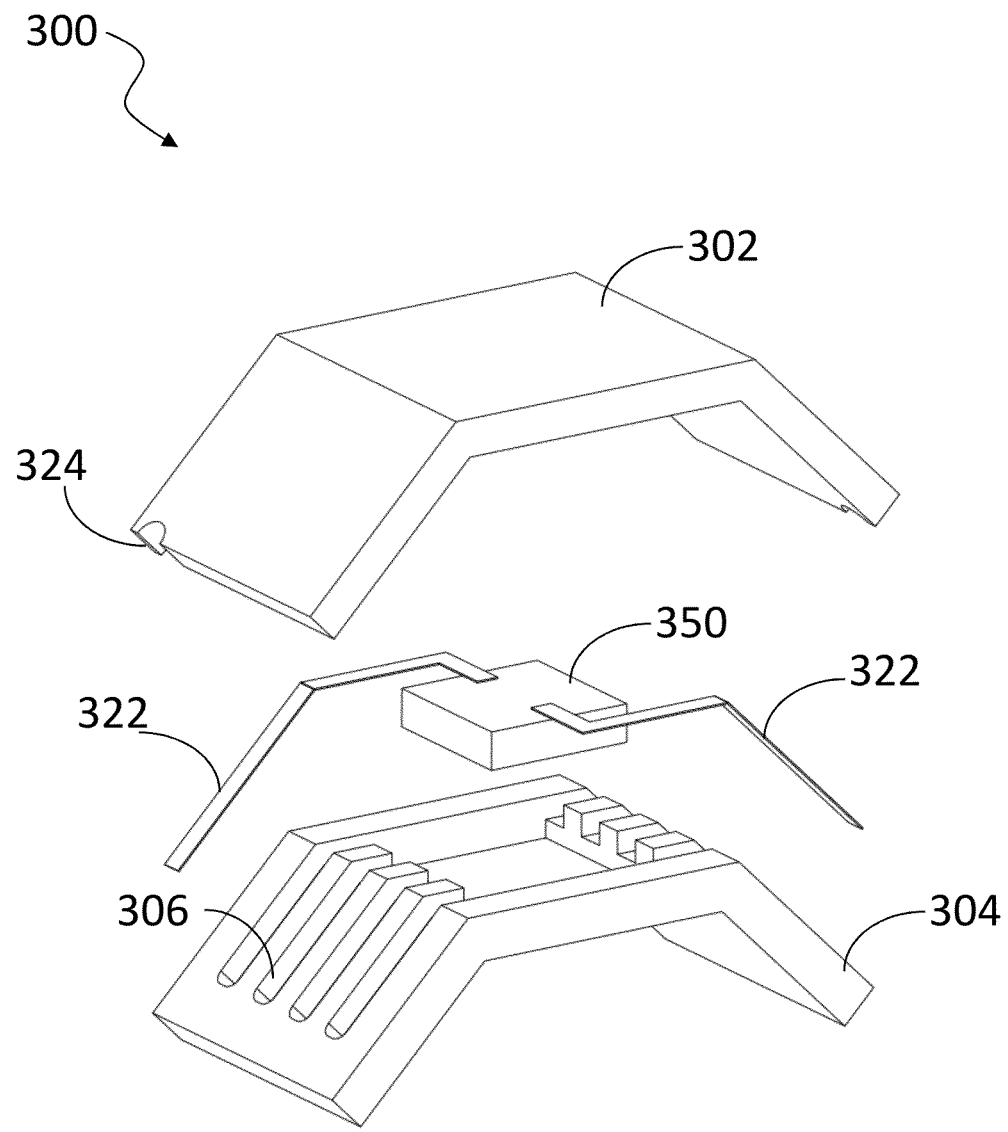
FIG. 3 is an exploded view illustrating a heat pipe attached to a heat-generating device according to another embodiment.
Figure 4A:
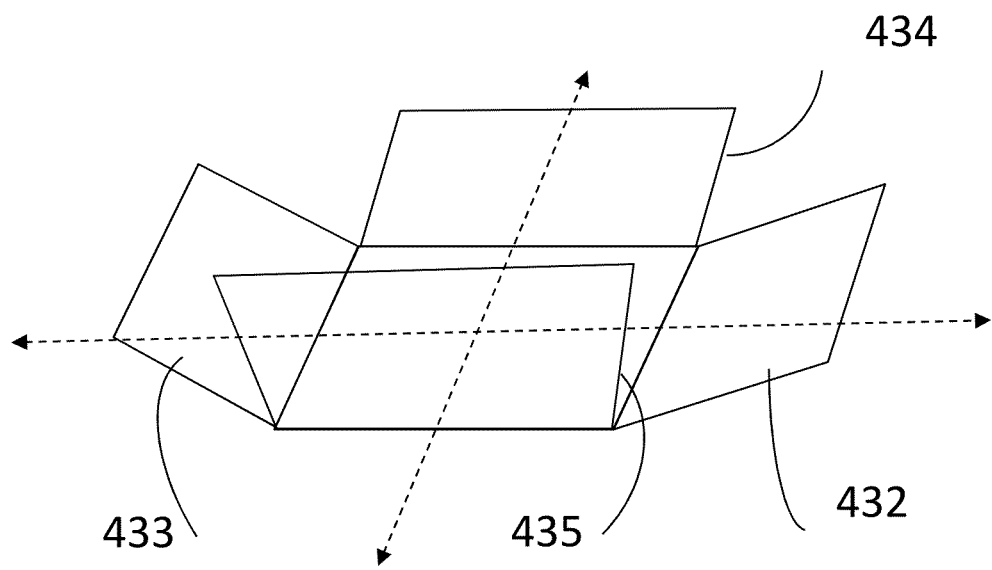
FIG. 4A illustrates a heat pipe shaped according to one embodiment.
Figure 4B:
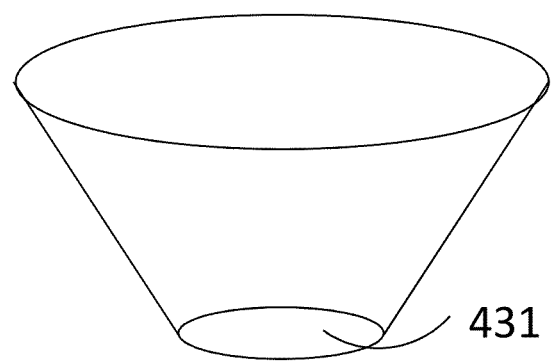
FIG. 4B illustrates a heat pipe shaped according to another embodiment.

It may not be necessary, especially in embodiments like that of FIG. 3, where light from the light source 350 does not need to pass through both sections before exiting the entire assembly, for both first and second sections to be transparent at the emission wavelength(s) of the light source. One of either the first or the second sections could be opaque in such cases, or reflective, or comprise a reflective coating such that the light from the light source is preferentially directed in a predetermined manner.

The operating principles of heat pipes in these and other embodiments of the present invention are as follows. For simplicity, embodiments with only first and second portions are explicitly described. Heat is transferred from one area of the heat pipe, configured to be in thermal contact with the device to be cooled, to another area of the heat pipe, configured to be in thermal contact with a heat sink, the transfer making use of thermal conductivity and liquid/vapor phase transition, in conjunction with vapor pressure and possible capillary action depending on the channel format. First, thermal conductivity causes heat to be transferred from the device to be cooled to the heat pipe. In cases where the device is attached to an outer surface of the first or second sections of the heat pipe in the first area, heat may be transferred through that outer surface to the liquid in the channel or channels in that first area. In cases where the device is enclosed between the two sections, heat may be transferred directly to the liquid. In all cases, the influx of heat causes the temperature of the liquid at the first portion of a channel in that first area to rise until the liquid vaporizes, and the vapor pressure, which increases as the temperature increases, forces the vapor molecules to move towards the second portion of the channel in the second area, which is at a sufficient distance from the heat-generating device to be at a significantly lower temperature. Thermal conductivity then causes the vapor to lose heat to the first and second sections in the second area of the heat pipe, this heat subsequently flowing into a heat sink in direct contact with an outer surface of the first or second sections of the heat pipe in that second area. This heat loss is sufficiently large to cause the vapor to condense back to a liquid. In other words, the liquid's latent heat of vaporization is released into the heat sink and ultimately to the ambient surroundings. The condensed vapor then returns to the first end of the channel, typically aided by capillary action and/or gravity, and the cycle repeats. The net result is a substantial transfer of heat from the device to be cooled through the heat pipe to the heat sink, positioned at a significant distance from the device. No electrical power or moving parts—at least no solid moving parts that consume external energy—are involved, and no noise is generated.

Embodiments of the present invention thus enable efficient and convenient cooling of a heat-generating device using a working fluid that vaporizes and condenses in an arrangement that increases the cooling efficiency by a minimum of 2 orders of magnitude in comparison to prior art approaches that use active techniques like forced convection (e.g. an electric fan). Moreover, of particular importance in cases where the device to be cooled is a light source such as an LED, the liquid and the first and second sections are selected to be transparent at certain wavelengths and blocking at other wavelengths, or bands of wavelengths, of the light emission, so that optical losses may be minimized in the desired band and maximized in the non-desired band. The wavelength transmission occurs even though portions of the heat pipe are present in the path of the emitted light. For example it is desirable to minimize the shorter wavelengths of light in the visible spectrum to avoid the blue tint that is associated with LED lighting.

In some embodiments, the material choice for the first and second sections of the heat pipe may be made to allow for convenient shaping. In many cases, glass is a suitable material choice for at least one of the two sections. In some cases, one section may comprise a ceramic material, or a metal. As noted above, in some cases the material of one section could be opaque, or reflective, or comprise a reflective coating such that the light emitted from the heat-generating device, acting as a light source, is preferentially directed in a predetermined manner.

In some cases, the heat pipe may include an optical diffuser, to deliberately diffuse the light passing through, increasing the effective area and effective uniformity of the light source.

In some embodiments, as shown in FIGS. 1 and 2, the heat pipe is shaped such that the first area is substantially flat, allowing for convenient attachment to a flat surface of the heat-generating device of interest. In some embodiments, the second and third areas are also substantially flat, and may lie in the same plane as the first area. In the specific embodiment of FIG. 1, the second and third areas are flat but are not co-planar with the first area. In some embodiments, such as that of FIG. 2, each of the first and second sections of the heat pipe is characterized by a non-planar curvature of varying order. In some embodiments, such as that of FIG. 4A, the heat pipe may be shaped such that fourth and/or fifth areas, 434, 435 are formed, extending along an axis perpendicular to the axis characterizing the extension of the second and third areas, 432, 433. In some embodiments, such as that of FIG. 4B, the heat pipe may be shaped to be approximately conical, with the first area 431 positioned at the base of the cone. Various other three-dimensional shapes may be advantageous according to the specific application of interest.

As noted above, in some embodiments where the device to be cooled is a light source, it may be advantageous for each of the first and second sections of the heat pipe to be transparent at the wavelength (or band of wavelengths) of the emitted light, so that optical losses are minimized even if some of the light passes through the heat pipe. In some embodiments, only one of the two sections may be transparent.

In the embodiment shown in FIG. 1, heat sinks 114A and 114B are positioned as if they are to be bonded to the upper surfaces of first section 102. Other positions, still allowing for attachment somewhere in the second and/or third areas 112A and 112B, may be chosen in other embodiments.

Figure 5:
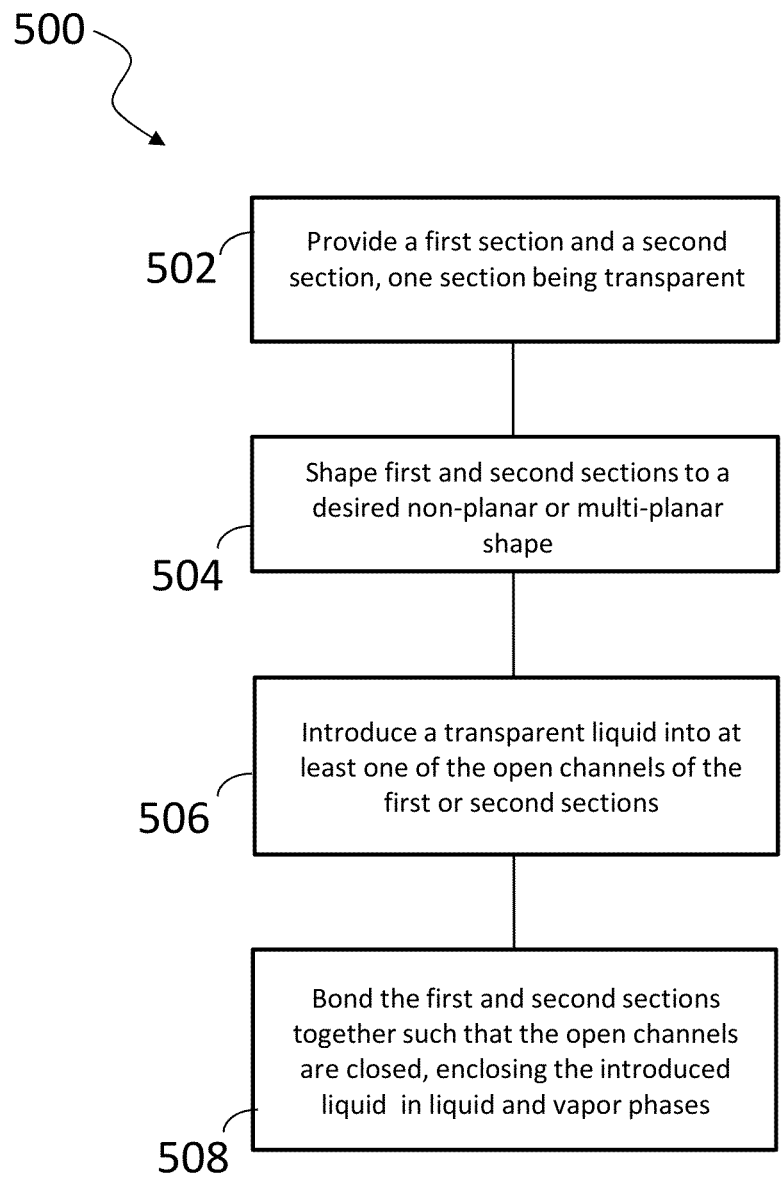
FIG. 5 is a flowchart of process steps for fabricating a heat pipe according to one embodiment.
Figure 6:
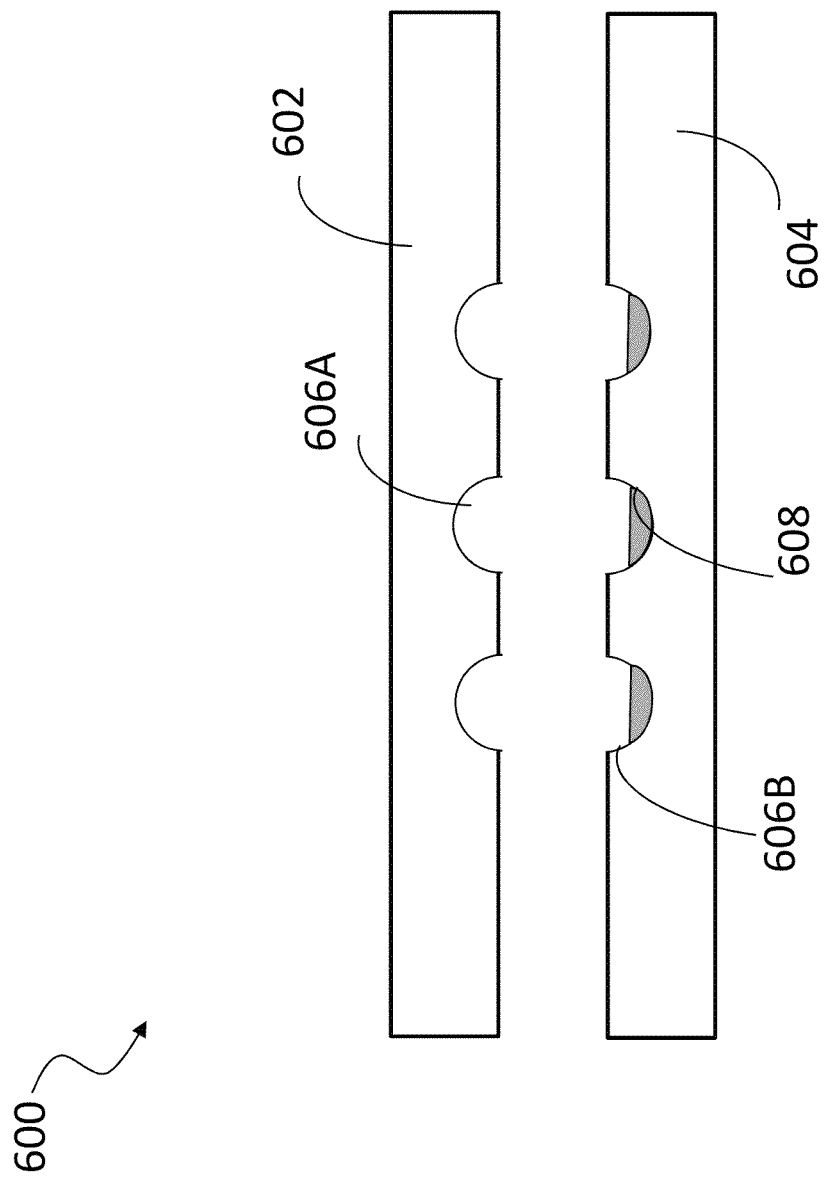
FIG. 6 is a cross section view of a heat pipe at one stage of fabrication according to one embodiment.

FIG. 5 illustrates the process steps of a method 500 for fabricating a heat pipe, according to some embodiments. FIG. 6 is a cross section view of a heat pipe 600, between steps 506 and 508 of method 500. At step 502 of method 500, a first section 602 and a second section 604 are provided, at least one of which is transparent. First section 602 comprises one or more preformed open channels 606A. Second section 604 comprises a corresponding, complementary one or more preformed open channels 606B. Channels 606A and 606B may have semicircular cross sections as shown, but other shapes such as rectangles may be chosen. The inner walls of channels 602 and 604 may be textured, plasma-treated, or silinated to facilitate capillary action by increasing the effective surface area, improving wetting and evaporation. First and second sections 602 and 604 may comprise glass. At step 504, first and second sections 602 and 604 are shaped to a desired non-planar or multi-planar shape using a corresponding tool. In some applications, the tool may include a mandrel. In some applications the tool may include a mold, a paddle, a pad, or other shaping aid. At step 506, a transparent liquid 608 is introduced into at least one of the open channels 606A and 606B. The volume of liquid introduced is controlled with precision, and is substantially smaller than the volume of the corresponding channel. At step 508, the first and second sections are bonded together such that the open channels are closed, enclosing the desired volume of the introduced liquid 608. This process may be performed under a controlled pressure or a vacuum. In either case, the remainder of the volume of the closed channel or channels will contain some vapor of liquid 608.

One technique that allows the bonding operation of step 508 to be advantageously achieved is room temperature laser bonding. This bonding technique which may also be used to attach one or more heat sinks to the fabricated heat pipe, will now be discussed. Full details of the technique are disclosed in patent publication 2013/0112650, referred to above, and incorporated by reference in the present application. In brief, the technique provides higher bond yields with lower demands on surface smoothness and cleanliness, without the imposition of high temperature.

Figure 7:
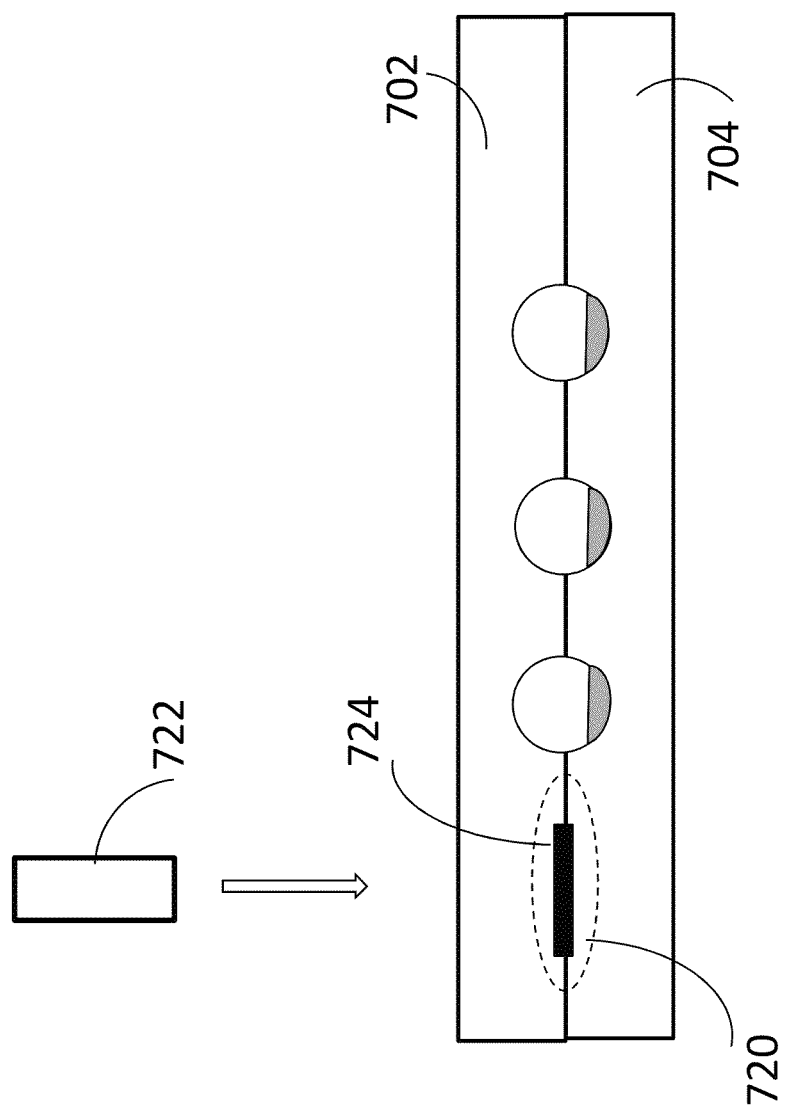
FIG. 7 is a schematic diagram illustrating how room temperature laser bonding may be employed during the attachment of a heat pipe to a heat-generating device according to one embodiment.

In the case illustrated in FIG. 7, concerning the bonding of first section 702 to second section 704 at bonding regions 720, many structural details have been omitted, and only one bonding region is shown for simplicity. Laser 722 emits light in the IR, visible or UV portions of the spectrum. This light is directed through the thickness of first section 702 onto a layer of absorbing material 724, either by direct positioning of laser 722 as shown for simplicity, or more typically via an optical system including elements such as mirrors, prisms and/or lenses (not shown). In some embodiments, light from a single laser 722 may be split into multiple beams to address multiple bonding regions simultaneously, in one or multiple devices; in some embodiments, a scanning system may allow for sequential addressing of bonding regions in one or multiple devices. In all cases, absorption of the laser light by layer 724 results in localized heating. The material of layer 724, which is chosen to have an affinity for diffusion into the material of the top plate and the central plate, may be deposited on either the top surface of second section 704 or on the bottom surface of first section 702. The absorption layer 724 may be a metal, semiconductor or ceramic material. In alternative embodiments other materials having appropriate wavelength absorption and diffusion affinity characteristics may be employed. The thickness of the absorbing layer may be as thin as 10 Å and as thick as desired to compensate for surface roughness. Layer thickness may also be relevant to the control of the laser bonding process when self-regulation, as discussed below, cannot be assumed. An example of a typical absorption layer would be 100 nm of Cr deposited on a surface smooth to 4 Å Ra.

While FIG. 7 illustrates the arrangement in the case of bonding step 508, for attachment of the first and second sections, a similar arrangement may be used to bond one or more heat sinks to the heat pipe following step 508, for example to second area 112A, shown in FIG. 1. In this case, absorbing layer 724 could be deposited on the upper surface of first section 112A, for example, and the laser light directed through the thickness of the bonded first and second sections in the corresponding area. In some embodiments absorbing layer 724 could be deposited on the bottom surface of heat sink 114A.

Figure 8:
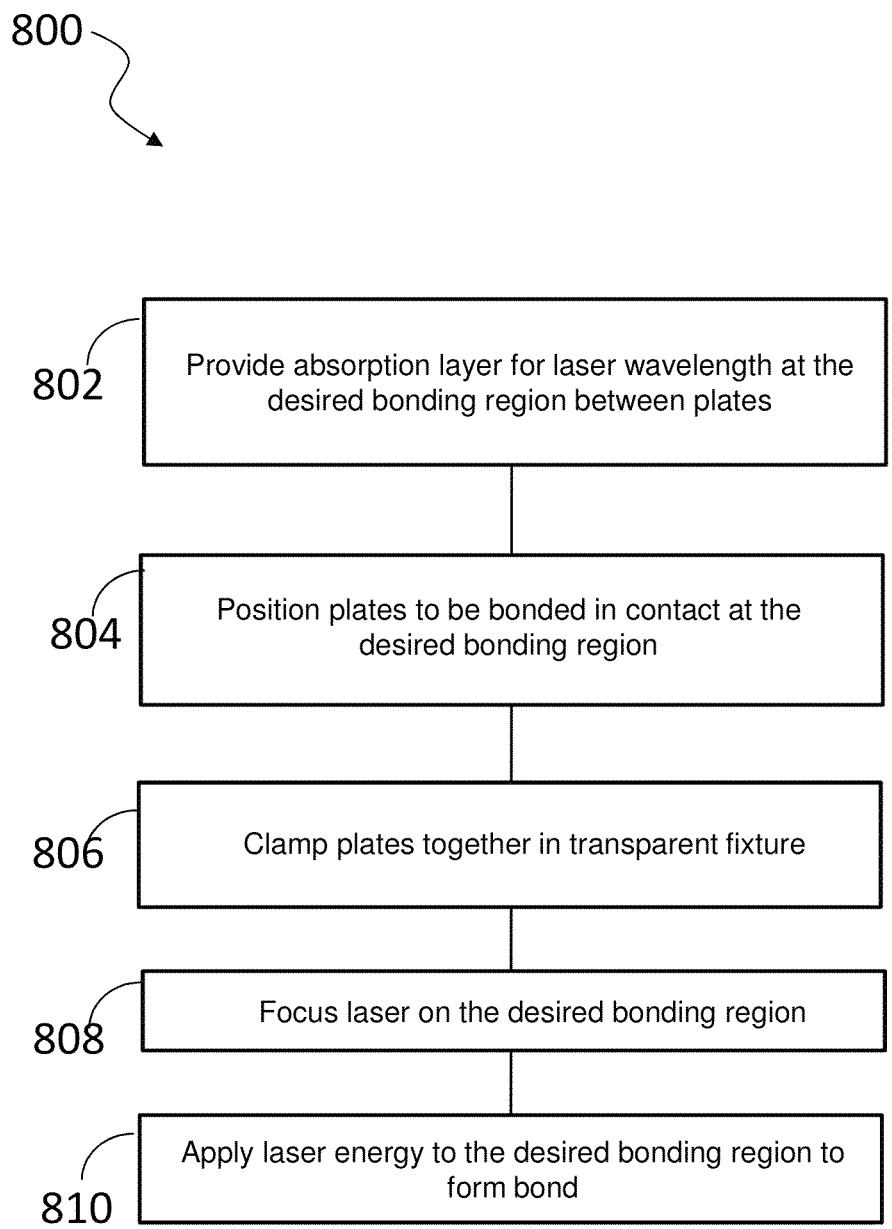
FIG. 8 is a flowchart showing process steps for room temperature laser bonding as used in some embodiments.

FIG. 8 is a flowchart of process steps for a method 800 that accomplishes bonding step 508 in some embodiments using room temperature laser bonding, with reference to the elements disclosed in FIG. 7. In step 802, a layer 724 that absorbs light at the laser wavelength is provided at the desired bonding region 720 between the plates to be bonded. This layer may be deposited on the contact surface of either of the two sections to be bonded. The absorption layer may be continuous over large regions of the top surface or patterned to limit the layer to the predetermined portions at which bonding is desired. Indeed, as will be described below, the layer may be patterned to provide not just bonding regions but also conductive traces to the heat-generating device in embodiments such as FIG. 2.

At step 804, the first and second sections are placed in contact with each other at the desired bonding region 720. The surfaces may or may not be extremely well polished. The thickness of the absorption layer can be thickened to compensate for surface roughness. At step 806, the first and second sections are clamped in a fixture that is transparent to the wavelength of laser energy being used. At step 808, the laser is roughly focused on the bonding region between the sections in the fixture. At step 810, the laser energy is applied to the bonding region. The energy may be incident either through the first section (as shown in FIG. 7) assuming the material of the first section transparent at the laser wavelength, or through the second section, assuming the material if the second section is transparent at the laser wavelength. If both the first and second sections are transparent at the laser wavelength, either arrangement may be used, the only absorbing material encountered being absorbing material 724 at the desired bonding region.

The application of laser energy at step 810 has a series of effects. First, the temperature of the absorption layer 724 at the location 720 of the desired bond rises, and the surfaces of both sections often in the areas in close proximity to that location. Those surfaces typically comprise one or more layers of glass or an oxide or nitride. Then, the absorption layer 724, which has continued to absorb the laser energy, forms a plasma, and the temperature of the absorption layer is raised to a diffusion temperature. Next, the absorption layer diffuses into the softened materials above and below it and the bonding region becomes transparent to the laser energy, so absorption ceases and the plasma collapses. Finally, the softened materials of the plate surface fuse together into a permanent bond. It is important to note that the absorption layer should diffuse at a temperature that is higher than the first transition temperature of the glass of at least one plate to ensure that the glass becomes soft and bonds to the glass (or oxide or nitride) of the other plate. This approach makes the most robust, least particulate sensitive bond.

In this example, the entire process takes place such that almost the entire bulk of the two heat pipe sections and, in the case of the enclosed device embodiment of FIG. 3, the heat-generating device, remain at room temperature and only the absorption layer and the materials of the first and second sections immediately adjacent the bond-line itself are elevated to a temperature where the absorption layer is diffused into those surrounding materials by absorbing the laser radiation. The width of a single bond-line can vary from approximately 0.001 µm to 100 µm or greater and the depth of the bond-line is nominally 500 nm into each component of the structure. However, it can vary from a fraction of a micrometer to multiple micro-meters.

The room temperature laser bonding process takes advantage of the affinity of metals, ceramics and semiconductors to diffuse into glass at elevated temperatures making the bond-line virtually transparent both in the visible spectrum and to the laser radiation wavelength. Therefore, in embodiments where the materials in the path of the laser are substantially transparent, the process is self-regulating. When the absorption layer has fully diffused into the surrounding materials, the laser energy passes through the ring and substrate with no further heating and the reaction stops. Therefore, any overheating of the liquid present in the channels of the first and second sections may be avoided.

The transparency of the material through which the laser passes before reaching the bond interface should be at least 70 percent at the wavelength at the laser energy. Otherwise, the reduced power penetration to the depth of the absorption layer may result in insufficient diffusion of the layer and thus an incomplete bond or no bond at all. Also, if too much laser radiation is absorbed prior to reaching that layer, the intervening material may be damaged.

The wavelength of the light emitted by the heat-generating device of the current invention may, but need not, be the same as the wavelength of laser 722.

Room temperature laser bonding may be used in batch processing embodiments in which multiple heat pipes are fabricated either sequentially or in parallel. In the case of sequential bonding, the laser energy is first applied to bonding regions 720 for one heat pipe, and then, after either satisfactory bonding or abandonment of that heat pipe, is applied to bonding regions of another heat pipe, and so on. Typically, a scan pattern such as a raster scan may be followed. In the case of simultaneous multi-device bonding, the output beam from laser 722 may be split into multiple beams, each of which is directed to be applied to a different heat pipe. A single laser may be employed even when multiple heat pipes are to be fabricated simultaneously, by employing beam splitters and a plurality of focusing optical trains.

An important advantage of room-temperature laser bonding as described herein is the ability to form conductive leads into the same interface layer that is being bonded. The structure of the leads may be formed by the laser track on the workpiece at the time of bonding. Therefore, it is not necessary to pattern the bonding layer to create a contact lead structure, which provides the additional "green" advantage of avoiding the deposition and etching processes required by alternative methods of lead formation. Moreover, in embodiments such as that shown in FIG. 3, where the heat-generating device is enclosed between first and second sections, this technique is particularly useful in both bonding the sections in place and forming the contact leads required for subsequent operation of the device, those leads emerging from the bonded, liquid containing assembly, to the dry exterior at which electrical power may be conveniently applied.

In some embodiments, the environment in which bonding occurs may be controlled with respect to both pressure and gaseous composition. Such control reduces contamination, resulting in improved yield of high quality bonds. As mentioned above, bonding may be carried out under a controlled pressure or a vacuum. In all cases, the volume of liquid sealed into the channels is carefully controlled so that the channels are partially filled to the precise extent required to optimize the cooling efficiency of the system. Room temperature laser bonding is particularly advantageous in this respect, for embodiments of the current invention, as the liquid being encapsulated is not subjected to any significant heating, and hence, will not evaporate and be lost before the bonding process is complete.

Although room temperature laser bonding offers many advantages, other methods that, for example, use epoxies, other adhesives, or glass frits, may be employed instead to achieve a seal in some embodiments.

The above-described embodiments should be considered as examples of the present invention, rather than as limiting the scope of the invention. Various modifications of the above-described embodiments of the present invention will become apparent to those skilled in the art from the foregoing description and accompanying drawings. Accordingly, the present invention is to be limited solely by the scope of the following claims.

The invention claimed is:

1. A heat pipe comprising:
a first section bonded to a second section such that a first channel is enclosed therebetween; and
a liquid partly filling the first channel;
wherein the bonded first and second sections comprise a first area configured to be bonded to a heat-generating device and a second area configured to be bonded to a heat sink;
wherein the first channel is characterized by a first portion within the first area and a second portion within the second area; and
wherein the liquid and at least one of the first section and the second section are transparent at a wavelength emitted by the heat-generating device.

2. The heat pipe of claim 1 wherein at least one of the first and second sections is configured in the second area to be attached to a heat sink.

3. The heat pipe of claim 1 wherein each of the first and second sections is characterized by a non-planar curvature.

4. The heat pipe of claim 1 wherein the first area is characterized by a first substantially flat plane and the second area is characterized by at least one substantially flat second plane that is not co-planar with the first plane.

5. The heat pipe of claim 1 wherein the heat-generating device is an LED and wherein at least one of the first and second sections is transparent at a wavelength of light emitted by the LED.

6. The heat pipe of claim 5 wherein the bonded first and second sections encapsulate the LED forming a bonded assembly, the leads of the LED being accessible from an outer surface of the bonded assembly.

7. The heat pipe of claim 5 wherein the LED is attached to an outer surface of the bonded first and second sections.

8. The heat pipe of claim 5 further comprising an optical diffuser.

9. The heat pipe of claim 1 wherein at least one of the first and second sections comprises glass.

10. The heat pipe of claim 1 wherein the first and second sections are bonded using room temperature laser bonding.

11. The heat pipe of claim 2 wherein the heat sink is attached using room temperature laser bonding.

12. A method of fabricating a heat pipe, the method comprising:
- providing a first section comprising a preformed open channel and a second section comprising a corresponding, complementary preformed open channel, wherein at least one of the first section and the second section is transparent at a predetermined wavelength;
- shaping the first and second sections to a desired non-planar or multi-planar shape using a corresponding tool;
- introducing a liquid into at least one of the open channels, the liquid being transparent at the predetermined wavelength; and
- bonding the first and second sections together such that the open channel is closed, enclosing the introduced liquid.

13. The method of claim 12 wherein after the bonding step, the bonded first and second sections comprise a first area configured to be bonded to a heat-generating device and a second area configured to be bonded to a heat sink.

14. The method of claim 13 wherein at least one of the first and second sections comprises glass.

15. The method of claim 12 wherein bonding the first and second sections together comprises room temperature laser bonding.

16. The method of claim 12 wherein introducing a liquid into at least one of the open channels comprises introducing a predetermined volume of a liquid, the predetermined volume being smaller than the volume available within the closed channel; and wherein introducing the transparent liquid and bonding the first and second sections together occur under a controlled pressure or a vacuum.

17. The method of claim 13 wherein the heat-generating device is an LED and wherein the predetermined wavelength is a wavelength of light emitted by the LED.

18. The method of claim 17 wherein bonding the first and second sections together comprises encapsulating the LED between the bonded sections.

19. The method of claim 12 wherein bonding the first and second sections together comprises room temperature laser bonding.

20. The method of claim 12 further comprising attaching a heat sink to at least one of the first and second sections in the second area.

* * * * *